US007379983B2

(12) United States Patent
Zaharias

(10) Patent No.: US 7,379,983 B2
(45) Date of Patent: May 27, 2008

(54) MERGING SCALABLE NODES INTO SINGLE-PARTITION MERGED SYSTEM USING SERVICE PROCESSORS OF NODES

(75) Inventor: Steven J. Zaharias, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 10/603,516

(22) Filed: Jun. 25, 2003

(65) Prior Publication Data

US 2004/0267894 A1 Dec. 30, 2004

(51) Int. Cl.
*G06F 15/177* (2006.01)
(52) U.S. Cl. ...................... 709/220; 717/162
(58) Field of Classification Search ................ 709/221, 709/220; 717/170, 162
See application file for complete search history.

(56) References Cited

U.S. PATENT DOCUMENTS

| 5,799,149 | A | 8/1998 | Brenner et al. |
| 5,881,227 | A | 3/1999 | Brenner et al. |
| 6,185,666 | B1 * | 2/2001 | Murray et al. ............... 711/173 |
| 6,510,428 | B2 | 1/2003 | Tsuchida et al. |
| 7,219,343 | B2 * | 5/2007 | Almeida et al. ............ 717/172 |
| 2001/0037435 | A1 | 11/2001 | Van Doren |
| 2002/0049966 | A1 * | 4/2002 | Lin ............................. 717/178 |
| 2003/0005039 | A1 | 1/2003 | Craddock et al. |

FOREIGN PATENT DOCUMENTS

WO  00/68834 A1  11/2000

OTHER PUBLICATIONS

J.A.G. Gendrano et al., "Parallel algorithms for computing temporal aggregates," 15th Int'l Conf. on Data Eng'g, IEEE Comp. Soc'y Tech. Comm. on Data Eng'g, Mar. 23-26, 1999, Sydney, Australia.
D.W. Cheung et al., "Asynchronous parallel algorithm for mining association rules on a shared-memory multi-processors," ACM Symposium on Parallel Algorithms and Architectures, Puero Vallarta, Mexico, 1998.
J. Rao et al., "Automating physical database design in a parallel database,", Procs. of the 2002 ACM SIGMOD Int'l Conf. on Management of Data, Madison, Wisconsin, 2002.
K. Govil et al., "Cellular disco: Resource management using virtual clusters on shared-memory multiprocessors," ACM Transactions on Computer Systems, 2000.

* cited by examiner

*Primary Examiner*—Kenneth R. Coulter
(74) *Attorney, Agent, or Firm*—Josh Cockburn

(57) ABSTRACT

Controlling the merging of nodes into a single-partition merged system using the nodes' service processors is disclosed. The system runs a single instance of an operating system. A user communicates with a service processor of a predetermined boot node to enter partition configuration information for the system without using a dedicated console. The partition configuration information is stored by the service processor of the boot node, and transmitted from the service processor of the boot node to the service processors of predetermined secondary nodes. The service processor of each secondary node then stores the partition configuration information. At reset, power-up, or power-down of any secondary node, the reset, power,-up or power-down is conveyed to the service processor of the boot node, which resets, starts up, or shuts down the system, including transmitting commands to the service processors of the secondary nodes to individually reset, start up, or shut down.

13 Claims, 4 Drawing Sheets

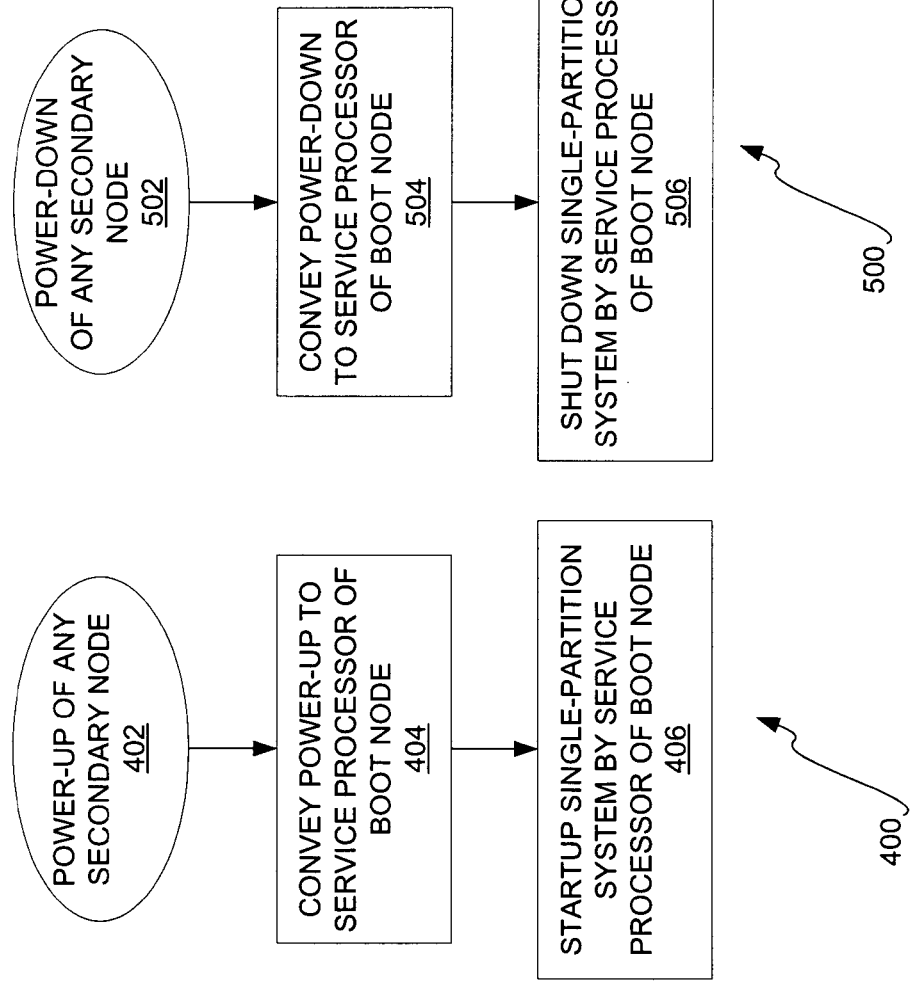
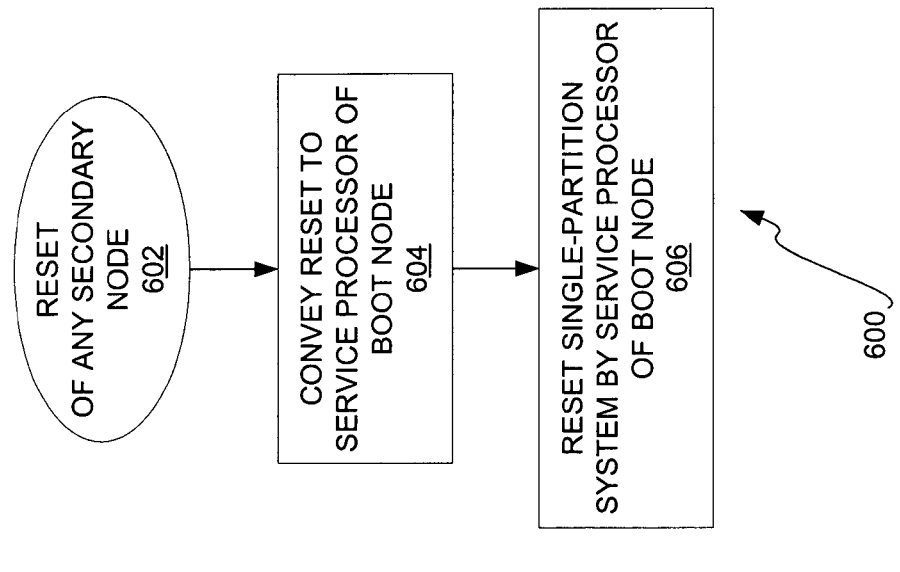
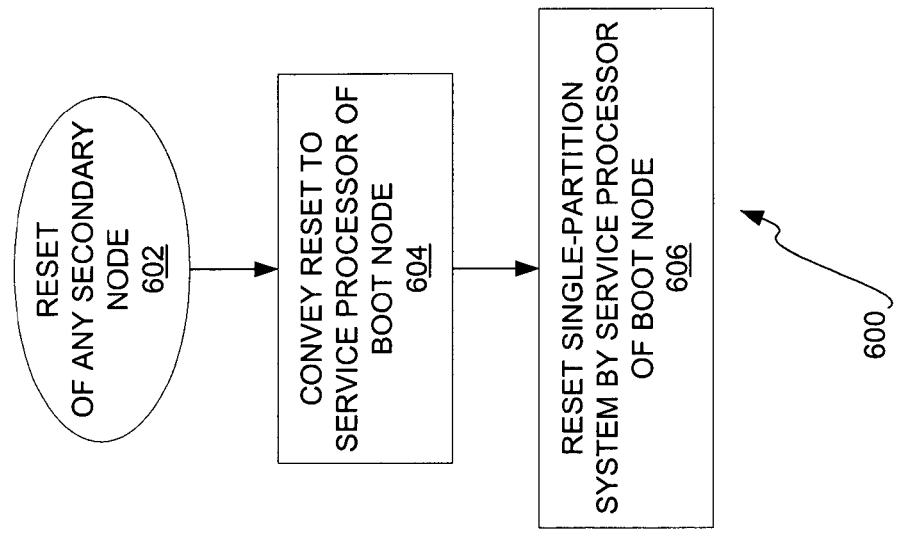

MERGING SCALABLE NODES INTO SINGLE-PARTITION MERGED SYSTEM USING SERVICE PROCESSORS OF NODES

BACKGROUND OF THE INVENTION

1. Technical Field

This invention relates generally to merging scalable nodes of a system into a single-partition merged system running a single instance of an operating system (OS), and more particularly to the control of such merging by using the service processors of the nodes.

2. Description of the Prior Art

As computing needs for organizations have increased, one common way to obtain greater computing power is to merge a number of scalable multiple-processor and/or single-processor nodes of a system so that the nodes function as a single-partition merged system. This is known as hardware partitioning. Such a system typically runs a single instance of an operating system (OS). The resources of all the nodes are thus conceptually combined, so that in effect the user experiences a single, more powerful computing system functioning as one scaled up node, instead of a number of less powerful nodes.

A traditional approach to combining multiple nodes of a system into a single-partition merged system running a single instance of an OS is to manually configure each node. An administrator interacts directly with each node, configuring each node with the proper partition configuration information, and specifying one of the nodes as the primary, or boot node, and the other nodes as secondary nodes to the primary node. This approach is cumbersome, however, especially where there are more than a few nodes to manually configure, and is prone to user data entry error.

Another approach is to have dedicated hardware that is responsible for configuring the nodes as a single-partition merged system running a single instance of an OS. An administrator interacts with the dedicated hardware, which may be, for instance, a dedicated management console. The hardware is then responsible for ensuring that the nodes operate as a single-partition merged system. However, this approach requires the addition of potentially costly hardware, and may require modification to preexisting systems that do not allow for the addition of such functionality.

A third approach is to have a luck-of-the-draw or timing-based approach programmed into the nodes of the system. When a node boots up, it determines whether a single-partition merged system is already running, and if so, joins the system. If the node does not find a preexisting system to join, it starts one, and becomes the primary node for the new system. The node thus becomes the primary node due to timing issues and the luck of the draw. Such an approach, however, can be complex, and does not provide the administrator with control over which node becomes the primary node.

For these and other reasons, therefore, there is a need for the present invention.

SUMMARY OF THE INVENTION

The invention relates to merging nodes into a single-partition merged system using the service processors of the nodes. A method of the invention includes a user communicating with a service processor of a predetermined boot node to enter partition configuration information for the single-partition merged system. The partition configuration information is stored by the service processor of the boot node, and transmitted from the service processor of the boot node to the service processors of predetermined secondary nodes. The service processor of each secondary node then stores the partition configuration information.

A single-partition merged system on which a single instance of an operating system (OS) is runnable includes at least one predetermined secondary node and a predetermined boot node. Each secondary node has a service processor to manage startup and shutdown of the secondary node. The boot node has a service processor to manage reset, startup, and/or shutdown of the boot node, and to supervise reset, startup, and/or shutdown of the at least one secondary node by sending reset, startup, and/or shutdown commands to the at least one secondary node.

An article of manufacture of the invention includes a computer-readable medium and means in the medium. The means is for transmitting partition configuration information for a single-partition merged system of a plurality of nodes from a service processor of a boot node to a service processor of each of at least one secondary node, and for storing the partition configuration by the service processor of the boot node. Other features and advantages of the invention will become apparent from the following detailed description of the presently preferred embodiment of the invention, taken in conjunction with the accompanying drawings.

BRIEF DESCRIPTION OF THE DRAWINGS

FIG. 4 is a flowchart of a method for starting up a single-partition merged system running a single instance of an OS at power-up of any of the secondary nodes of the system, according to an embodiment of the invention.

FIG. 5 is a flowchart of a method for shutting down a single-partition merged system running a single instance of an OS at power-down of any of the secondary nodes of the system, according to an embodiment of the invention.

FIG. 6 is a flowchart of a method for resetting a single-partition merged system running a single instance of an OS following a reset of any of the secondary nodes of the system, according to an embodiment of the invention

DESCRIPTION OF THE PREFERRED EMBODIMENT

Merging Nodes into Single-Partition Merged System

Figure 1:
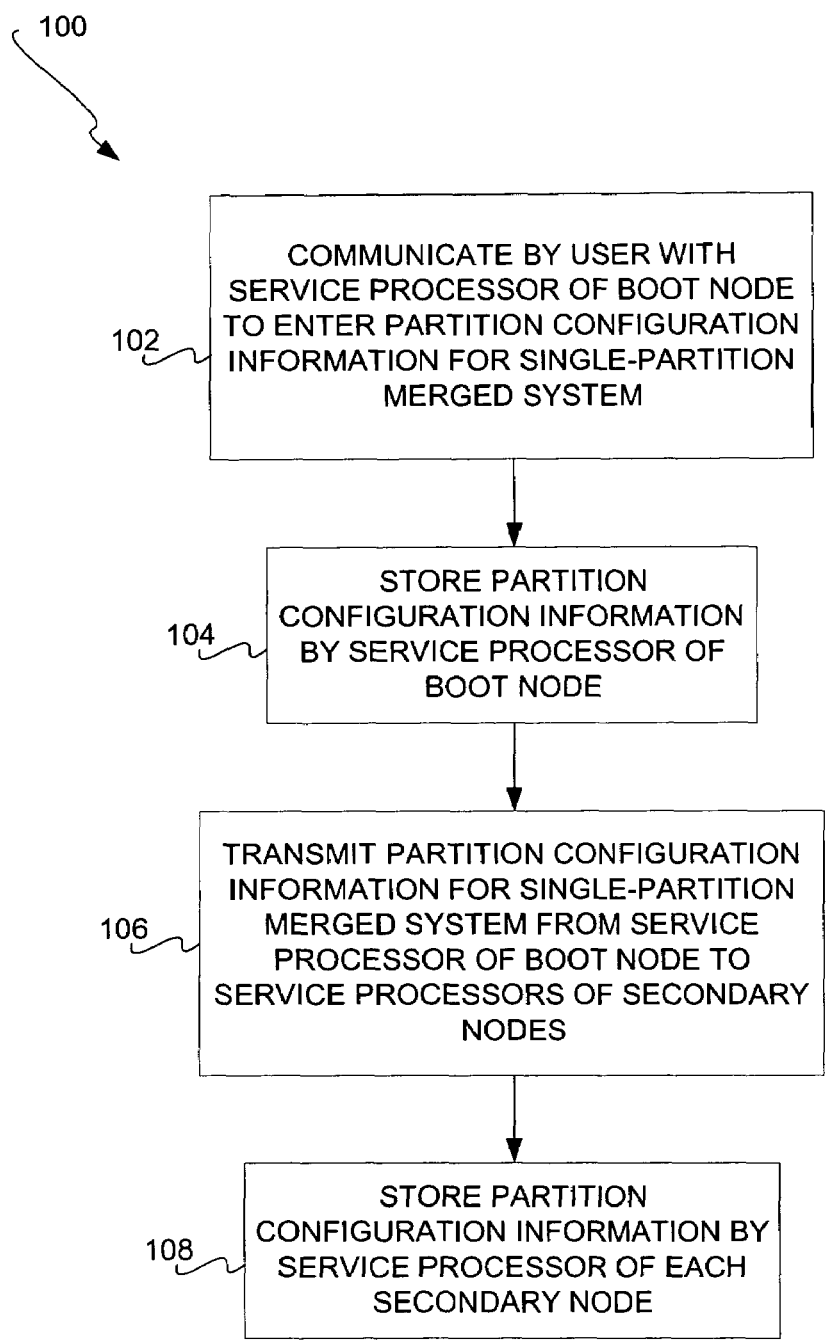
FIG. 1 is a flowchart of a method for merging nodes into a single-partition merged system running a single instance of an operating system (OS), according to a preferred embodiment of the invention, and is suggested for printing on the first page of the patent.

FIG. 1 shows a method 100 for merging nodes into a single-partition merged system running a single instance of an operating system (OS), according to a preferred embodiment of the invention. The method 100, as well as other methods of embodiments of the invention, may be wholly or partially implemented in conjunction with a computer-readable medium on an article of manufacture. The computer-readable medium may be a recordable data storage medium, a modulated carrier signal, or another type of computer-readable medium.

A user communicates with a service processor of a boot node to enter partition configuration information for the single-partition merged system (102). The boot node is predetermined in that the user is able to select which of the nodes functions as the boot node. The boot node may also be referred to as the primary node of the system, in that it manages the startup and shutdown of the merged system as a whole by appropriately communicating with other nodes of the system, which are referred to as secondary nodes. The service processor of a node is an adjunct processor to one or more primary processors of the node. The service processor is responsible for processing corollary data so that the node is able to run as configured. The service processor is not responsible for the processing of data of application and other programs, which is the province of the primary processors, such as the central processing units (CPU's), of the node.

The user communicates with the service processor of the boot node without having to use a dedicated console. For instance, the user may utilize a web page user interface provided by the service processor of the boot node, on any node of the system, over the Internet, an intranet, an extranet, and/or another type of network, and so on. The Java programming language may be employed to implement the web page user interface. As another example, the user may employ a console management application running on a separate system administration computer to communicate with the service processor of the boot node. The application may access any node of the system, over the Internet, an intranet, an extranet, and/or another type of network, and so on. The Transmission Control Protocol/Internet Protocol (TCP/IP) may be employed to communicate with the management application in this regard.

The partition configuration information is stored by the service processor of the boot node (104). The partition configuration information s the single-partition merged system to be configured. For instance, the information may specify which nodes are to be part of the system, which nodes are secondary nodes and which node is the primary node, which OS the system is to run, and so on. The information may be stored on non-volatile random-access memory (NVRAM) for the service processor, such as firmware. It may be additionally or alternatively be stored on the Basic Input/Output System (BIOS) of the boot node, where the service processor accesses the BIOS through an advanced setup menu, for instance, and where the service processor is communicatively connected to the BIOS through a Peripheral Component Interconnect (PCI) bus or another type of communications bus.

The service processor of the boot node transmits the partition configuration information to the service processors of the secondary nodes (106). The boot node and the secondary nodes may be part of the same chassis or different chasses, which are physical structures that may hold, for instance, rack-mountable components such as nodes. A node itself may be considered a complete computing unit capable of running an operating system, having processors, memory, input/output (I/O) devices, and so on. The boot node and the secondary nodes may be able to communicate with one another via scalability hardware and scalability cables. They may also be able to communicate with one another via other controllers, using other communications protocols. The service processor of each secondary node ultimately stores the partition configuration information (108), in its firmware, NVRAM, and/or BIOS, and so on.

Single-Partition Merged System and Node Thereof

Figure 2:
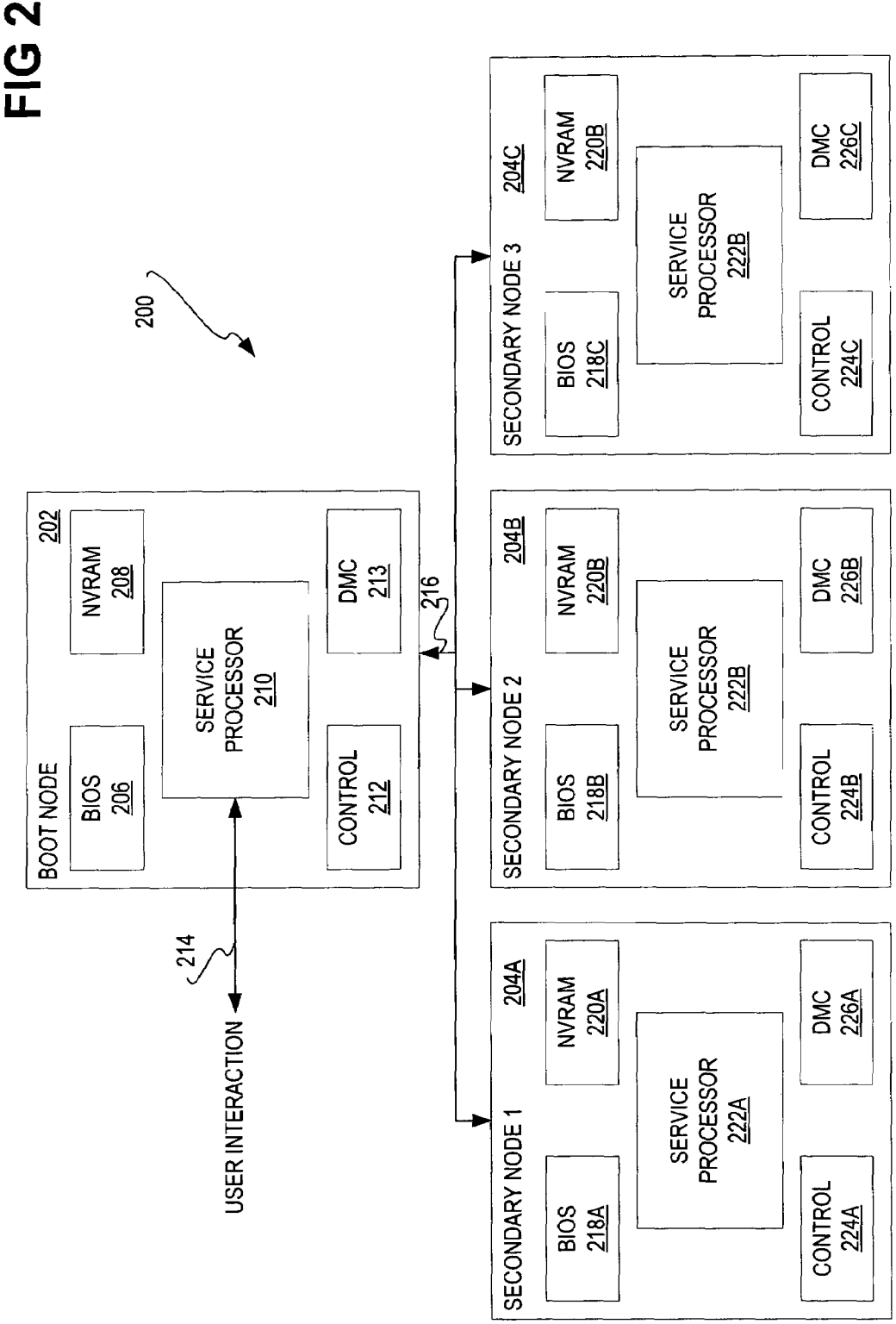
FIG. 2 is a diagram of a single-partition merged system having a number of nodes and running a single instance of an OS, according to an embodiment of the invention.

FIG. 2 shows a single-partition merged system 200, according to an embodiment of the invention. The system 200 preferably runs a single instance of an operating system (OS). The system 200 includes a predetermined boot node 202, and predetermined secondary nodes 204A, 204B, and 204C, collectively referred to as the secondary nodes 204. There may be more or fewer of the secondary nodes 204 than depicted in FIG. 2. The boot node 202 and the secondary nodes 204 are coupled to one another via an interconnect 216, and so on. That is, the boot node 202 is able to send commands to and receive commands from the secondary nodes 204 over the interconnect 216. The nodes 202 and 204 may be part of the same chassis or different chasses.

The boot node 202 includes a Basic Input/Output System (BIOS) 206, non-volatile random-access memory (NVRAM) 208, a service processor 210 connected to a management network, a user-actuable control 212, and a drawer management controller (DMC) 213. The boot node 202 may also include components in addition to and/or in lieu of those depicted in FIG. 2. The user interacts directly with the service processor 210 of the boot node 202, as indicated by the bi-directional line 214 via the management network, or through a Peripheral Component Interconnect (PCI) bus using a BIOS setup menu. The BIOS 206 is generally a set of routines for the boot node 202 that provides an interface between the OS and the hardware, and controls functionality such as power-on self test (POST). The NVRAM 208 retains its contents even when power is not supplied to it, and may be the firmware for the boot node 202.

The service processor 210 is a corollary processor to the primary processor(s) of the boot node 202. The control 212 can be actuated to turn on or off the merged system 200, and or to reset the merged system 200, as is described in a subsequent section of the detailed description. The Drawer Management Controller (DMC) 213 is the controller that allows the node 202 to communicate power state information, temperature, fan speed and other information with the service processor, and the DMC receives control commands from the service processor 210.

The secondary nodes 204A, 204B, and 204C also include BIOS 218A, 218B, and 218C, respectively, and which are collectively referred to as the BIOS 218. The secondary nodes 204A, 204B, and 204C include NVRAM 220A, 220B, and 220C, respectively, and which are collectively referred to as the NVRAM 220. The secondary nodes 204A, 204B, and 204C include service processors 222A, 222B, and 222C, respectively, and which are collectively referred to as the service processors 222, each of which is connected to a management network. The secondary nodes 204A, 204B, and 204C include user-actuable controls 224A, 224B, and 224C, respectively, and which are collectively referred to as the controls 224. The secondary nodes 204A, 204B, and 204C include DMC 226A, 226B, and 226C, respectively, and which are collectively referred to as the DMC 226. The BIOS 218, the NVRAM 220, the service processors 222, the controls 224, and the DMC 226 of the secondary nodes 204 perform functionality as has been described in the previous paragraph as to the BIOS 206, the NVRAM 208, the service processor 210, the control 212, and the DMC 213 of the boot node 202.

Figure 3:
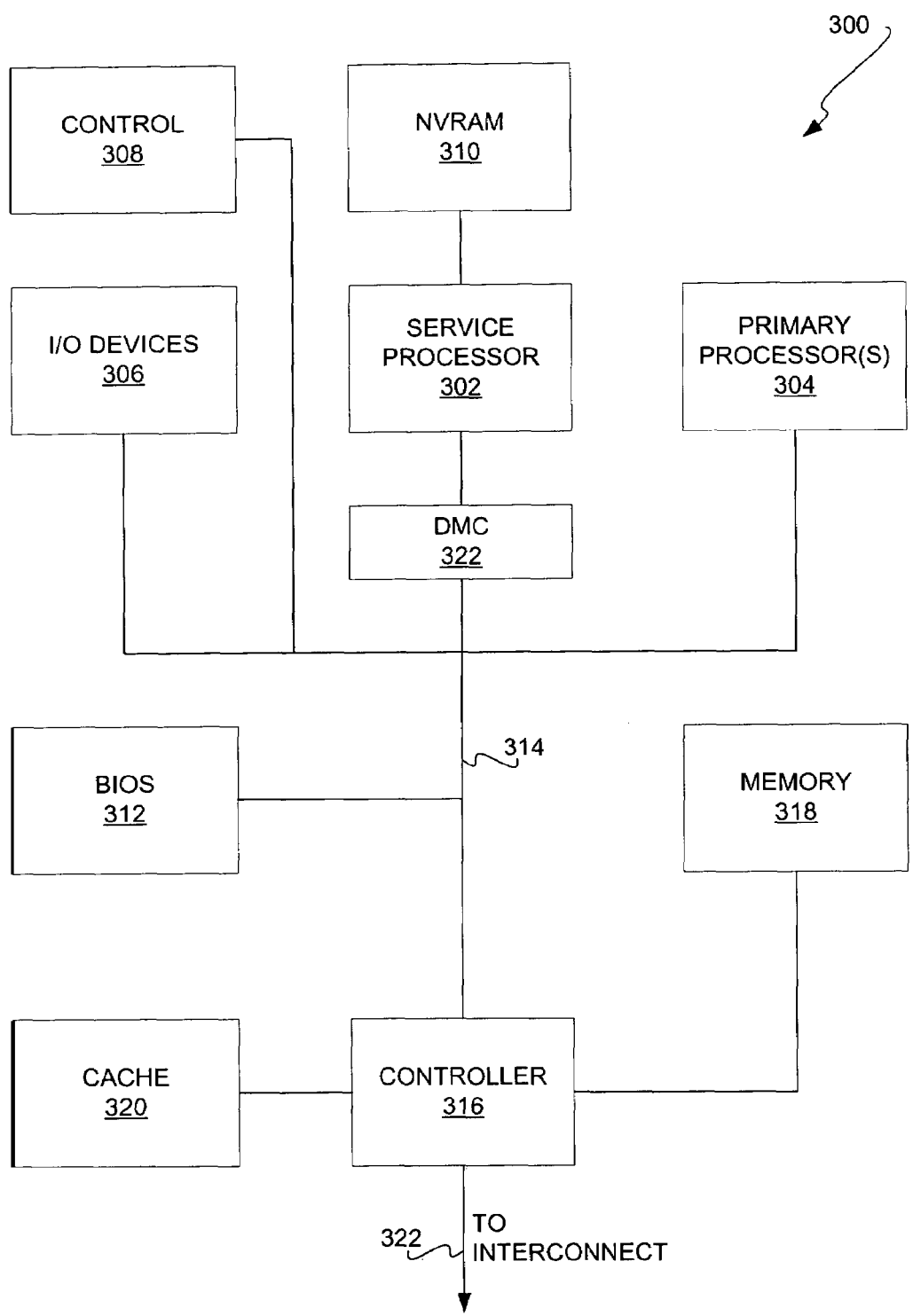
FIG. 3 is a diagram of one of the nodes of the system of FIG. 2 in more detail, according to an embodiment of the invention.

FIG. 3 shows in detail a node 300, according to an embodiment of the invention, that can implement one or more of the nodes 202 and 204 of FIG. 2. As can be appreciated by those of ordinary skill within the art, the node 300 may include other components in addition to and/or in lieu of those depicted in FIG. 3. Furthermore, the node 300 of FIG. 3 is meant as representative of one type of node in conjunction with which embodiments of the invention can be implemented. Embodiments of the invention are also amenable to implementation in conjunction with other types of nodes, as can be appreciated by those of ordinary skill within the art.

The node 300 includes a service processor 302, primary processor(s) 304, input/output (I/O) devices 306, a user-actuable control 308, and BIOS 312 that are connected to a common bus 314. The bus 314 may be a Peripheral Component Interconnect (PCI) bus, and/or another type of bus. The service processor 302 contains the NVRAM 310. A controller 316 is also connected to the bus 314, and manages operations relating to the primary random-access memory 318 of the node 300. In support of this functionality, the controller 316 has a cache 320. The controller 322 also manages communication with other nodes through an interconnect, such as the interconnect 216 of FIG. 2, as indicated by the arrow 322.

Startup, Shutdown, and Reset of Single-Partition Merged System

FIG. 4 shows a method 400 for starting up a single-partition merged system preferably running a single instance of an operating system (OS), according to an embodiment of the invention. Any of the predetermined secondary nodes is powered up (402). For instance, a user may manually actuate a power control of a secondary node, or the secondary node may receive a power-up command. In response, the secondary node that is powered up conveys the power-up through the Drawer Management Controller (DMC) to the local service processor, via an appropriate command, to the service processor of the predetermined boot node (404) using a management network, such as an interconnect. Thus, the secondary node does not perform any startup functionality itself in response to the power-up. The service processor of the boot node then starts up the single-partition merged system (406). For instance, the service processor of the boot node may transmit appropriate startup commands to the service processors of the secondary nodes to start up. It is only at this time that the secondary nodes start themselves up.

FIG. 5 shows a method 500 for shutting down a single-partition merged system preferably running a single instance of an OS, according to an embodiment of the invention. Any of the secondary nodes is powered down (502). For instance, a user may manually actuate a power control of a secondary node, or the secondary node may receive a power-down command. In response, the secondary node that is powered down conveys the power-down through the DMC to the local service processor, via an appropriate command, to the service processor of the boot node (504) using the management network. The secondary node does not perform any shutdown functionality itself in response to the power-down. The service processor of the boot node then shuts down the single-partition merged system (506). The service processor of the boot node may transmit appropriate shutdown commands to the service processors of the secondary nodes to shut down. It is only at this time that these nodes themselves shut down.

FIG. 6 shows a method 600 for resetting a single-partition merged system preferably running a single instance of an OS, according to an embodiment of the invention. Any of the secondary nodes is reset (602). For instance, a user may manually actuate a reset control of a secondary node, or the secondary node may receive a reset command. In response, the secondary node that is reset conveys the reset request through the DMC to the local service processor, via an appropriate command, to the service processor of the boot node (604) using the management network. The secondary node does not perform any reset functionality itself in response to the reset. The service processor of the boot node then resets the single-partition merged system (606). The service processor of the boot node may transmit appropriate reset commands to the service processors of the secondary nodes to reset. It is only at this time that these nodes themselves reset.

Advantages over the Prior Art

Embodiments of the invention allow for advantages over the prior art. A user enters partition configuration setup information only once. The delivery of the same information to the service processor of each secondary node is guaranteed, and the connection complexity for the console management application is reduced. Entering the setup information in one place minimizes the chance for data entry errors and reduces user data entry effort.

Furthermore, by guaranteeing that the same partition configuration information is transmitted to the service processor of each secondary node, the chance of boot failure due to data entry errors is minimized. Multi-way service processor functionality may also be used to verify that the configuration information is consistent at boot time, repairing that data when secondary service processors are replaced or flashed, as can be appreciated by those of ordinary skill within the art. Partition state integrity is also maintained. This ensures that partition control operations are not attempted using new configurations when there is a partition node membership overlap with other active running partitions.

In addition, reducing connection complexity to a single service processor simplifies server extension access or other console management applications. This makes it easier to send high-level partition control commands to the primary service processor, which can then distribute individual node shutdown and startup commands to the secondary nodes. Status can be collected for each individual service processor command and returned as one status message back to the requesting management application.

Furthermore, power and reset handling is uniquely accomplished by embodiments of the invention. That is, actuation of a power or a reset control by any of the secondary nodes does not immediately result in the power up or reset of the secondary node in question. Rather, this secondary node conveys the power up or reset to the boot node, which then powers up or resets the entire single-partition merged system.

The lack of a dedicated attached console allows embodiments of the invention to realize cost savings over prior art systems that require such consoles. Furthermore, the user is provided with full control of the system using the power or reset control of any nodes, rather than having to utilize only a console. Multi-way service processor functionality also enables the coordination and sequencing of implicit partition control operations in response to power and reset events from partitioned nodes.

Alternative Embodiments

It will be appreciated that, although specific embodiments of the invention have been described herein for purposes of illustration, various modifications may be made without departing from the spirit and scope of the invention. For instance, the system that has been described as amenable to implementation with a given type of node. However, other embodiments of the invention can be implemented with other types of nodes. Accordingly, the scope of protection of this invention is limited only by the following claims and their equivalents.

I claim:

1. A method for controlling a merge process of a plurality of nodes into a single-partition merged system comprising:
communicating by a user with a service processor of a predetermined boot node of the plurality of nodes to enter partition configuration information for the single-partition merged system, the partition configuration information specifying at least which of the plurality of nodes is to be a primary node of the single-partition merged system to be constructed and which of the plurality of nodes are to be secondary nodes of the single-partition merged system to be constructed;
storing the partition configuration information by the service processor of the boot node;
transmitting the partition configuration information for the single-partition merged system from the service processor of the boot node to service processors of predetermined secondary nodes of the plurality of nodes; and,
storing the partition configuration information by the service processor of each of the secondary nodes,
wherein the plurality of nodes are merged into the single-partition merged system that is configured based on the partition configuration information, each node having at least a primary processor other than the service processor of the node.

2. The method of claim 1, wherein communicating by the user with the service processor of the boot node comprises communicating by the user with the service processor of the boot node without using a dedicated console.

3. The method of claim 1, wherein communicating by the user with the service processor of the boot node comprises utilizing a web page user interface to communicate with the service processor of the boot node.

4. The method of claim 1, wherein communicating by the user with the service processor of the boot node comprises utilizing a console management application to communicate with the service processor of the boot node.

5. The method of claim 1, further comprising, at power-up of any of the plurality of nodes:
conveying the power-up to the service processor of the boot node; and,
starting up the single-partition merged system by the service processor of the boot node, including transmitting commands from the service processor of the boot node to the service processors of the secondary nodes to start up.

6. The method of claim 5, wherein power-up of any of the plurality of nodes comprises manual actuation of a control on any of the plurality of nodes by the user.

7. The method of claim 5, wherein power-up of any of the plurality of nodes comprises receipt of a power-up command by any of the plurality of nodes.

8. The method of claim 1, further comprising, at power-down of any of the plurality of nodes:
conveying the power-down to the boot node;
shutting down the single-partition merged system by the boot node, including transmitting commands from the boot node to the secondary nodes to shut down.

9. The method of claim 8, wherein power-down of any of the plurality of nodes comprises manual actuation of a control on any of the plurality of nodes by the user.

10. The method of claim 8, wherein power-down of any of the plurality of nodes comprises receipt of a power-down command by any of the plurality of nodes.

11. The method of claim 1, further comprising, at a reset of any of the plurality of nodes:
conveying the reset to the boot node;
resetting the single-partition merged system by the boot node, including transmitting commands from the boot node to the secondary nodes to reset.

12. The method of claim 11, wherein reset of any of the plurality of nodes comprises manual actuation of a control on any of the plurality of nodes by the user.

13. The method of claim 11, wherein reset of any of the plurality of nodes comprises receipt of a reset command by any of the plurality of nodes.

* * * * *